(12) United States Patent
Wilczynski et al.

(10) Patent No.: US 11,880,467 B2
(45) Date of Patent: *Jan. 23, 2024

(54) SECURITY-AWARE CACHING OF RESOURCES

(71) Applicant: Palantir Technologies Inc., Denver, CO (US)

(72) Inventors: Peter Wilczynski, San Francisco, CA (US); Daniel Zangri, San Francisco, CA (US); Nicholas Morgan, San Francisco, CA (US); Stephen Freiberg, Palo Alto, CA (US)

(73) Assignee: Palantir Technologies Inc., Denver, CO (US)

(*) Notice: Subject to any disclaimer, the term of this patent is extended or adjusted under 35 U.S.C. 154(b) by 130 days.

This patent is subject to a terminal disclaimer.

(21) Appl. No.: 17/323,368

(22) Filed: May 18, 2021

(65) Prior Publication Data

US 2021/0271760 A1 Sep. 2, 2021

Related U.S. Application Data

(63) Continuation of application No. 16/405,313, filed on May 7, 2019, now Pat. No. 11,010,476.
(Continued)

(51) Int. Cl.
*G06F 21/57* (2013.01)
*G06F 9/50* (2006.01)
(Continued)

(52) U.S. Cl.
CPC .............. *G06F 21/57* (2013.01); *G06F 9/50* (2013.01); *G06F 12/0815* (2013.01); *G06F 21/335* (2013.01); *G06F 21/6209* (2013.01)

(58) Field of Classification Search
CPC ........ G06F 21/57; G06F 9/50; G06F 12/0815; G06F 21/335; G06F 21/6209; G06F 2221/2143; G06F 21/629; H04L 67/568
See application file for complete search history.

(56) References Cited

U.S. PATENT DOCUMENTS 7,594,003 B2  9/2009  Davidson et al.
7,698,280 B2  4/2010  Bhat et al.
(Continued)

FOREIGN PATENT DOCUMENTS

EP  1320014 A2  6/2003

OTHER PUBLICATIONS

Extended European Search Report for EP Appln. No. 19213295.9 dated Mar. 11, 2020, 7 pages.

*Primary Examiner* — Baotran N To
(74) *Attorney, Agent, or Firm* — Sheppard Mullin Richter & Hampton LLP

(57) ABSTRACT

Systems, methods, and non-transitory computer readable media are provided for security-aware caching of resources. An offline version of a resource may be prepared for a computing device. The offline version of the resource may include a security parameter. The security parameter may define a security rule to be enforced with respect to offline usage of the resource. The offline version of the resource may be provided for caching by the computing device. The cache of the offline version of the resource may enable the offline usage of the resource by the computing device. The security rule for the offline usage of the resource may be enforced by the computing device based on the security parameter.

19 Claims, 7 Drawing Sheets

Related U.S. Application Data

(60) Provisional application No. 62/775,249, filed on Dec. 4, 2018.

(51) Int. Cl.
   *G06F 12/0815* (2016.01)
   *G06F 21/33* (2013.01)
   *G06F 21/62* (2013.01)

(56) References Cited

U.S. PATENT DOCUMENTS

| | | |
|---|---|---|
| 7,730,155 B1 | 6/2010 | Meyer |
| 8,689,294 B1 | 4/2014 | Thakur |
| 8,832,275 B1 | 9/2014 | Hara |
| 9,396,126 B2 * | 7/2016 | Fioravanti ............ G06F 12/0891 |
| 9,760,681 B2 * | 9/2017 | Douglass ............... G16H 10/60 |
| 9,836,742 B2 * | 12/2017 | Mongillo, III ......... G06Q 20/20 |
| 11,010,476 B2 * | 5/2021 | Wilczynski ........... G06F 21/629 |
| 2009/0265754 A1 | 10/2009 | Hinds |
| 2013/0007371 A1 | 1/2013 | Hilerio |
| 2013/0097248 A1 | 4/2013 | Chakra |
| 2014/0173700 A1 | 6/2014 | Awan |
| 2015/0189036 A1 | 7/2015 | He |
| 2015/0199278 A1 | 7/2015 | Fioravanti |
| 2015/0262174 A1 | 9/2015 | Mongillo, III |
| 2016/0147944 A1 | 5/2016 | Douglass |
| 2016/0191645 A1 | 6/2016 | Hayton et al. |
| 2020/0175167 A1 * | 6/2020 | Wilczynski ......... G06F 21/6209 |

* cited by examiner

SECURITY-AWARE CACHING OF RESOURCES

CROSS REFERENCE TO RELATED APPLICATIONS

This application is a continuation of U.S. application Ser. No. 16/405,313, filed May 7, 2019, now U.S. Pat. No. 11,010,476, which claims the benefit under 35 U.S.C. § 119(e) of the U.S. Application No. 62/775,249, filed Dec. 4, 2018, the content of each of which is hereby incorporated by reference in its entirety.

FIELD OF THE INVENTION

This disclosure relates to approaches for providing security-aware caching of resources.

BACKGROUND

Under conventional approaches, a resource (e.g., application, data) may be remotely provided to a client by a server. If the connection between the client and the server is lost or poor, the client may be unable to utilize the resource. Simply downloading the resource to the client may expose the resource to vulnerabilities of the client and may make it difficult to secure the resource.

SUMMARY

Various embodiments of the present disclosure may include systems, methods, and non-transitory computer readable media configured to facilitate security-aware caching of resources. A resource may comprise an application and/or parts thereof. There may be different versions of resources, including an offline version of a resource (or, simply, an offline resource) and online version of the resource (or, simply, an online resource). An offline version of a resource may be prepared for a computing device. The offline version of the resource may include a security parameter. The security parameter may define a security rule to be enforced with respect to offline usage of the resource. The offline version of the resource may be provided for caching by the computing device. The cache of the offline version of the resource may enable the offline usage of the resource by the computing device. The security rule for the offline usage of the resource may be enforced by the computing device based on the security parameter.

In some embodiments, the offline version of the resource may be prepared responsive to a request for the offline version of the resource for the computing device.

In some embodiments, the resource may include a dataset and the offline version of the resource includes a portion of the dataset.

In some embodiments, the resource may include an application and the offline version of the resource includes a portion of the application. The offline version of the resource including the portion of the application may result in a functionality of the application being limited during the offline usage of the resource.

In some embodiments, the security rule may require additional user authentication for the offline usage of the resource.

In some embodiments, the security rule may require future modification or removal of the offline version of the resource from the cache of the offline version of the resource.

In some embodiments, the computing device may toggle between online and offline usage of the resource based on (1) user input or (2) connection between the computing device and a server providing the resource.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
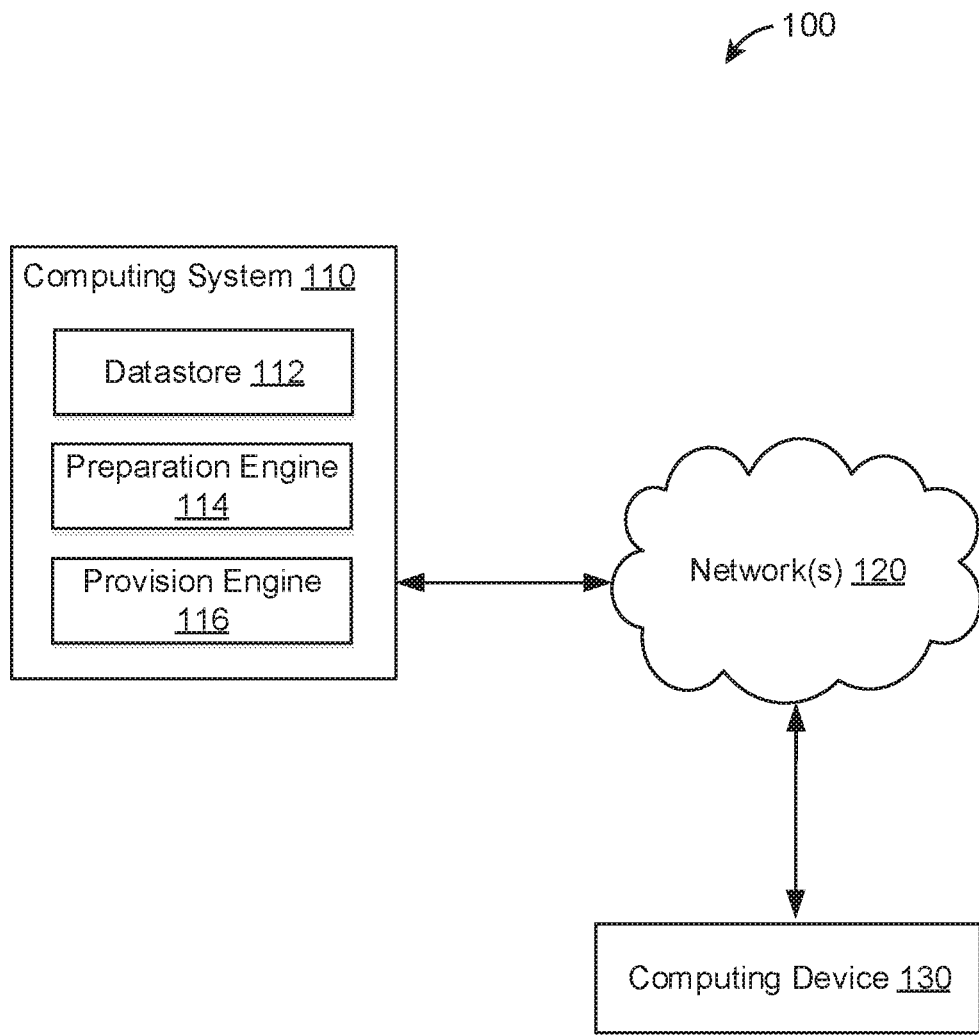
FIG. 1 illustrates an example environment for providing security-aware caching of resources, in accordance with various embodiments.

A claimed solution rooted in computer technology overcomes problems specifically arising in the realm of computer technology. In various implementations, a computing system is configured to prepare an offline version of a resource for a computing device. The offline version of the resource may include a security parameter. The security parameter may define a security rule to be enforced with respect to offline usage of the resource. The computing system may provide the offline version of the resource for caching by the computing device. The cache of the offline version of the resource may enable the offline usage of the resource by the computing device. The security rule for the offline usage of the resource may be enforced by the computing device based on the security parameter.

In some embodiments, a resource comprises an application and/or parts thereof. There may be different versions of resources, including an offline version of a resource (or, simply, an offline resource) and online version of the resource (or, simply, an online resource). The offline version of the resource may result in functionality of the application being limited during the offline usage of the resource. For example, certain functionalities of the application may not be available during offline usage. It will be appreciated that reference to a resource without specifying a version (e.g., offline or online) may reference the online version of the resource and/or the offline version of the resource.

In some embodiments, the offline version of the resource may be prepared responsive to a request for the offline version of the resource for the computing device. For example, the computing system may receive a request for the offline version of the resource for the computing device and may prepare the offline version of the resource responsive to the request.

In some embodiments, the online version of the resource may include a dataset and the offline version of the resource includes a portion of the dataset. For example, only a portion of the dataset may be allowed to be cached for offline usage.

In some embodiments, the security rule may require additional user authentication for the offline usage of the resource. For example, the computing device may require a user to provide more user authentication during offline usage than online usage. As another example, the computing device may require a user to provide user authentication during offline usage of the resource to continue the offline usage of the resource. Failure of the user to provide such additional user authentication may result in revocation of the offline usage of the resource.

In some embodiments, the security rule may require future modification or removal of the offline version of the resource from the cache of the offline version of the resource. For example, the computing device may change or delete a portion of the offline version of the resource from the cache after a period of time. Such modification or removal of the offline version of the resource from the cache may enable the computing device to follow resource usage policy that would be managed by the server during online usage of the resource.

In some embodiments, the computing device may toggle between online and offline usage of the resource based on (1) user input or (2) connection between the computing device and a server providing the resource. For example, a user may interact with the computing device to switch between online usage and offline usage of the resource. As another example, when the connection between the computing device and the server providing the resource is detected to be lost or poor (e.g., analysis of the bandwidth, analysis of failed communications, failure of the computing device to ping the server), the computing device may switch to an offline mode and return to an online mode when the connection is restored. As yet another example, if connection between the computing device and the server is expected to be down in the future (e.g., due to maintenance of the server), the computing device and/or the server may plan for the offline usage of the resource by the computing device.

The approaches disclosed herein may facilitate security-aware caching of resources. A server may make an online version of a resource available for use at a client. Poor connection or lack of connection between the server and the client may make the online version of the resource unavailable or difficult to use. The approaches disclosed herein provides for preparation and provision of an offline version of the resource to the client, which enables the client to provide offline usage of the resource. The offline version of the resource may include one or more security parameters and may be cached by the client with. The client may use the security parameter(s) within the offline version of the resource to enforce one or more security rules with respect to the offline usage of the resource.

FIG. 1 illustrates an example environment 100 for providing security-aware caching of resources. The example environment 100 may include a computing system 110, one or more networks 120, and a computing device 130. The computing system 110 and/or the computing device 130 may include one or more processors and memory. The processor(s) may be configured to perform various operations by interpreting machine-readable instructions stored in the memory. The computing system 110 and the computing device 130 may communicate over the network(s) 120 (e.g., internet, intranet, extranet). While the computing system 110 and the computing device 130 are shown in FIG. 1 as single entities, this is merely for ease of reference and is not meant to be limiting. One or more components/functionalities of the computing system 110 and/or the computing device 130 described herein may be implemented in a single computing device or multiple computing devices. The computing system 110 and/or the computing device 130 may be implemented in non-mobile device(s) (e.g., desktop device) and/or or mobile device(s) (e.g., laptop, mobile device). The environment 100 may also include one or more datastores (not shown) that is accessible to the computing system 110 (e.g., via one or more network(s)). In some embodiments, the datastore(s) may include various databases, application functionalities, application/data packages, and/or other data that are available for download, installation, and/or execution.

In various embodiments, the computing system 110 may include a datastore 112, a preparation engine 114, a provision engine 116, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100.

In various embodiments, the preparation engine 114 may be configured to prepare an offline version of a resource for one or more computing devices. For example, the preparation engine 113 may prepare an offline version of a resource for the computing device 130. A resource may refer to information/collection of information and/or one or more tools for operating on information. For example, a resource may include one or more of a dataset, an application, and/or other resource provided by and/or through the computing system 110. Preparing an offline version of a resource for a computing device may include preparing the resource so that the computing device may use the resource without having connection to the computing system 110. Preparing an offline version of a resource may include identifying the resource, identifying one or more portions of the resource, creating/packaging a copy or a replica of the resource, creating/packaging a copy or a replica of one or more portions of the resource, and/or otherwise preparing the offline version of the resource. An offline version of a resource may have the same information and/or functionality as the online version of the resource or may have a smaller subset of information and/or functionality as the online version of the resource.

For example, an online version of the resource may include a dataset and an offline version of the resource may include one or more portions of the dataset. For instance, only a portion of the dataset may be allowed to be cached for offline usage. As another example, an online version of the resource may include an application and an offline version of the resource may include one or more portions of the application. The offline version of the resource including portion(s) of the application may result in one or more functionalities of the application being limited during the offline usage of the resource relative to online usage of the resource. For instance, certain functionalities of the application may not be available/disabled during offline usage of the resource.

In some embodiments, preparing an offline version of a resource may include creating/packaging a copy/replica of the online version of the resource (or one or more portions of the online version of the resource) with other information or tool(s). For instance, dependency of an online version of a resource may be analyzed to determine what other information/tools should be included within an offline version of the resource. For example, usage of a dataset may require information from another dataset, and preparing an offline version of the dataset may include adding the information from the other dataset into the offline version of the dataset. As another example, usage of an application in an online version of the resource may require information from a dataset, and preparing an offline version of the resource may include adding the information from the dataset into the offline version of the resource in order to use the application while offline. As yet another example, a dataset (e.g., raw data) may have been used to create one or more objects (e.g., user work product) during usage of an online version of the resource. Preparing the data for usage by the offline version of the resource may include adding the objects created from the dataset during usage of the online version of the resource.

The extent to which dependent/related information and/or tools are included in the offline version of the resource may be customizable. For instance, a user may set a number of hops and/or size within which dependent/related information and/or tool should be included within the offline version of the resource. For example, an offline version of a resource may include information/tools that are within a certain number of dependency/relationship hops from the resource. As another example, dependent/related information/tool may be included within the offline version of the resource if the dependent/related information/tool is below a certain size and/or if the offline version of the resource is below a certain size.

In some embodiments, portion(s) of a resource that are included in the offline version of the resource may be determined based on user selection, system defaults, and/or other information. For example, the portion(s) of a dataset that is to be included in the offline version of the dataset may be selected by a user. A user may directly and/or indirectly select the portion(s) to be included in the offline version of the resource. For example, a user may interact with a user interface to select one or more files, one or more folders of files, and/or one or more functionalities to be included in the offline version of the resource. As another example, a user may perform a search of data/tools (e.g., keyword searching/filtering, temporal searching/filtering, geospatial searching/filtering, object-type searching/filtering) matching one or more criteria, and the results of the search may be used to identify the portion(s) of the resource included in the offline version of the resource. As yet another example, the portion(s) of the resource included in the offline version of the resource may be set based on one or more defaults (e.g., set by an administrator, set by an organized, set within the computing system 110, set within a computing/storage device), determined based on user identity (e.g., different offline versions of a resource are available to different users/teams of users), and/or other customizable options.

In some embodiments, preparing an offline version of a resource may include preparing one or more updates to the resource. An update to a resource may include one or more changes to the resource, such as removal of one or more portions of the resource, addition of one or more new portions of the resource, and/or modification to one or more portions of the resource. For example, a resource may include a map of a location. The map included in the offline version of the resource may change. For example, details may be added/removed from the map and/or one or more conditions (weather conditions) included with the map may change over time. Rather than preparing a new version of the map, changes to the map may be prepared as update to the offline version of the map. The changes may be incorporated locally by the computing device with the offline version of the map. For example, an offline version of the map may be cached by the computing device 130 and changes to the map may be provided as an update by the computing system 110. The computing device 130 may receive the update and locally incorporate the changes to the map within the cache. Preparing and providing updates to previously prepared/provided offline version of a resource, rather than prepare a whole new offline version of the resource, may reduce the size of information/data communicated between the computing system 110 and the computing device 130 to update the offline version of the resource.

In some embodiments, multiple clocks may be used to keep track of updates/changes to the offline version of the resource. For example, a global clock may be used to track whether the entirety of the offline version of the resource has been updated while an object clock may be used to track whether a particular object of the offline version of the resource has been updated. For instance, when one or more components of an object included within the offline version of the resource is updated, the clock for the object may be changed to reflect that the update to the object has been received and/or implemented. The global clock for the offline version of the resource may not be changed to indicate that update(s) for the entire resource has not yet been received and/or implemented.

An offline version of a resource may include one or more security parameters. A security parameter may define one or more security rules to be enforced with respect to offline usage of the resource. A security parameter may include one or more values that are associated with, characterize, and/or used to implement the security rule(s) to be enforced with respect to offline usage of the resource. A security parameter may be used as one of the parameters in providing access control for the resource. A security rule may refer to one or more principles and/or one or more instructions that dictate how to secure the resource. For example, a security rule may include one or more instructions on who, how, when, and/or where the resource may be used.

In some embodiments, a security rule for offline usage of the resource may be the same as a security rule for online usage of the resource. That is, a security rule for offline usage of the resource may mirror a security rule for online usage of the resource. Such a security rule may allow a user to have same access to the resource regardless of whether the online or the offline version of the resource is being used.

For example, a security rule for online usage of the resource may define one or more types of users and one or more types of access (e.g., read access, write access, access based on location, access based on time) given to different types of users with respect to the resource. A security rule for offline usage of the resource may mirror the security rule for the online usage of the resource and define the same type(s) of users and the same type(s) of access given to the user types with respect to the resource.

As another example, a security rule for online usage of the resource may require future modification or removal of the online version of the resource (or one or more portions of the online version of the resource). For instance, a dataset (or a portion of a dataset) may be available for a limited amount of time and a security rule for the dataset may require the dataset (or the portion of the dataset) to be modified and/or removed (e.g., deleted, locked). A security rule for offline usage of the resource may mirror the security rule for the online usage of the resource and require future modification or removal of the offline version of the resource (or one or more portions of the offline version of the resource) from the offline version of the resource (e.g., the offline version of the resource in the cache of the computing device 130). For example, the computing device 130 may change or delete a portion of the offline version of the resource from the cache after a period of time. Such modification or removal of the offline version of the resource from the cache may enable the computing device 130 to follow resource usage policy that would be managed by the computing system 110 (e.g., server) during online usage of the resource.

In some embodiments, a security rule for offline usage of the resource may be different from a security rule for online usage of the resource. Such a security rule may allow a user to have different access to the resource (e.g., users have different permission to access the resource) based on whether the online or the offline version of the resource is being used. For example, a security rule for online usage of the resource may define one or more types of users and one or more types of access (e.g., read access, write access, access based on location, access based on time) given to different types of users with respect to the resource. A security rule for offline usage of the resource may define different type(s) of users and/or different type(s) of access given to the user types with respect to the resource when compared to the security rule for online usage of the resource.

As another example, a security rule for online usage of the resource may require future modification or removal of the online version of the resource (or one or more portions of the online version of the resource). A security rule for offline usage of the resource may require different modification or removal with respect to the offline version of the resource (or one or more portions of the offline version of the resource). For example, the offline version of the resource (e.g., the offline version of the resource in the cache of the computing device 130) may be required by the security rule to be changed and/or deleted sooner, later, and/or based on different occurrence of condition(s) than the online version of the resource. For instance, an offline version of a sensitive dataset may be required to be deleted sooner than online version of the sensitive dataset. Alternatively, the online version of the sensitive dataset may not require modification and/or removal while the offline version of the sensitive dataset may require modification and/or removal.

In some embodiments, a security rule for offline usage of the resource may include a reporting component. For example, a security rule for offline usage of the resource may record when, where, and/or how the resource is downloaded, accessed, and/or altered, and the recorded information may be reported to the computing system 110 and/or other devices. If the reporting indicates that the offline usage of the resource has in violation of some usage restriction, the offline usage of the resource may be terminated and/or frozen. For example, during syncing of updates for the resource between the computing system 110 and the computing device 130, the offline usage of the resource by the computing device 130 may be disabled.

In some embodiments, the security rule may require additional user authentication for offline usage of the resource. That is, additional user authentication may be required for offline usage of the resource than online usage of the resource. For example, the computing device 130 may require a user to provide more user authentication (e.g., to confirm the identity and/or access of the user with respect to the resource) during offline usage than online usage. As another example, the computing device 130 may require a user to provide user authentication during offline usage of the resource to continue the offline usage of the resource. In some embodiments, the authentication may be provided by the computing device 130 to the computing system 110 and/or other system for confirmation that the authentication is correct (e.g., over reduced bandwidth between the computing device 130 and the computing system 110, over radio/text). Failure of the user to provide such additional user authentication may result in termination of the offline usage of the resource.

In some embodiments, an offline version of a resource may be prepared responsive to a request for the offline version of the resource for a computing device. For example, the computing system 110 may receive a request for the offline version of the resource for the computing device 130. The request may be received directly at the computing system 110, received directly and/or indirectly from the computing device 130, and/or received directly and/or indirectly from other locations. Responsive to the request, the offline version of the resource for the computing device 130 may be prepared.

In some embodiments, an offline version of a resource may be prepared based on communication connection (e.g., network connection) for a computing device. For example, the computing system 110 may monitor the connection with the computing device 130 and may prepare an offline version of a resource responsive to detecting deterioration of the connection (e.g., reduced bandwidth, missed communications). As another example, the computing system 110 may predict when the connection with the computing device 130 may be down or poor. For instance, the computing device 110 may identify that one or more of the network(s) 120 may be down in the future and may prepare an offline version of a resource in anticipation of the network(s) going down. Such preparation of the offline version of the resource may enable the computing system 110 to prepare and provide the offline version of the resource while the computing system 110 has connection to the computing device 130.

Alternatively, and/or in addition, the computing system 110 and/or the computing device 130 may monitor where the computing system 110 and/or the computing device 130 may be in the future and may prepare an offline version of a resource based on either or both of the computing system 110 and/or the computing device 130 being scheduled/ anticipated to be in a location with no/poor network condition. For instance, a user of the computing device 130 may be planning on trip in which the network connection may be poor, and the computing system 110 may prepare an offline version of a resource in anticipation of the trip. The computing system 110 and/or the computing device 130 may monitor when the computing system 110 is expected to be down (e.g., due to maintenance of the computing system 110) and may prepare an offline version of a resource based on the computing system 110 being scheduled/anticipated to be down. Such preparation of the offline version of the resource may enable the computing system 110 to plan for offline usage of the resource by the computing device 130.

In some embodiments, the computing device 130 may toggle between online and offline usage of a resource based on (1) user input and/or (2) connection between the computing device 130 and the computing system 110 (e.g., a server) providing the resource. For example, a user may interact with the computing device 130 to switch between online usage and offline usage of the resource. As another example, when the connection between the computing device 130 and the computing system 110/server providing the resource is detected to be lost or poor (e.g., analysis of the bandwidth, analysis of failed communications, failure of the computing device to ping the server), the computing device 130 may switch to an offline mode (and utilize an offline version of the resource). The computing device 130 may return to an online mode (and utilize an online version of the resource) when the connection is restored.

In various embodiments, the provision engine 116 may be configured to provide the offline version of the resource to one or more computing devices. Providing the offline version of the resource to a computing device may include making the offline version of the resource available (e.g., for use, for download) by the computing device. The offline version of the resource may be downloaded (pulled) by computing device and/or uploaded (pushed) to the computing device.

The offline version of the resource may be provided for caching by the computing device(s). A cache of the offline version of the resource may enable offline usage of the resource by the computing device(s). For example, the provision engine 116 may provide an offline version of a resource for caching by the computing device 130. The computing device 130 may cache the offline version of the resource, and the offline version of the resource in the cache may be used by the computing device 130 to enable offline usage of the resource at or from the computing device 130. A cache may refer to a location for storing information. Information stored within a cache may be quickly accessed by the computing device 130. A cache of the computing device 130 may be located in memory of the computing device 130 and/or a memory coupled to the computing device 130. A cache of the computing device 130 may include one or more of browser cache, disk cache, memory cache, processor cache, and/or other cache. The cache in which the offline version of the resource is stored may operate as the main storage area for the offline usage of the resource.

In some embodiments, the offline version of the resource may be cached based on priority of the information within the offline version of the resource. For example, the offline version of the resource may include multiple objects, and components of the objects that are more important and/or more often used may be cached before other components of the objects. Caching of components of objects may enable more efficient changes to parts of the objects than caching of entire objects. For example, only a small component of an object may be expected to be changed frequently and/or over time, and caching of the components of the object may enable changes to the relevant component in the cache rather than changing the entire object in the cache. As another example, when the computing device 130 synchronizes with the computing system 110, changes between the online and offline versions of the resource may be detected and resolved using cached components.

A security rule for offline usage of a resource may be enforced by a computing device based on one or more security parameters in the offline version of the resource. The security parameter(s) in the offline version of the resource may make the offline version of the resource in the cache security-aware. That is, usage of the offline version of the resource in the cache by the computing device 130 may be aware of and enforce one or more security rules for the resource. The security rule(s) for the offline usage of the resource may be enforced by the computing device based on the security parameter(s). For example, objects may be cached with security rules (e.g., different access permissions) so that the use of the objects by the computing device 130 conforms to the security rules.

Figure 2:
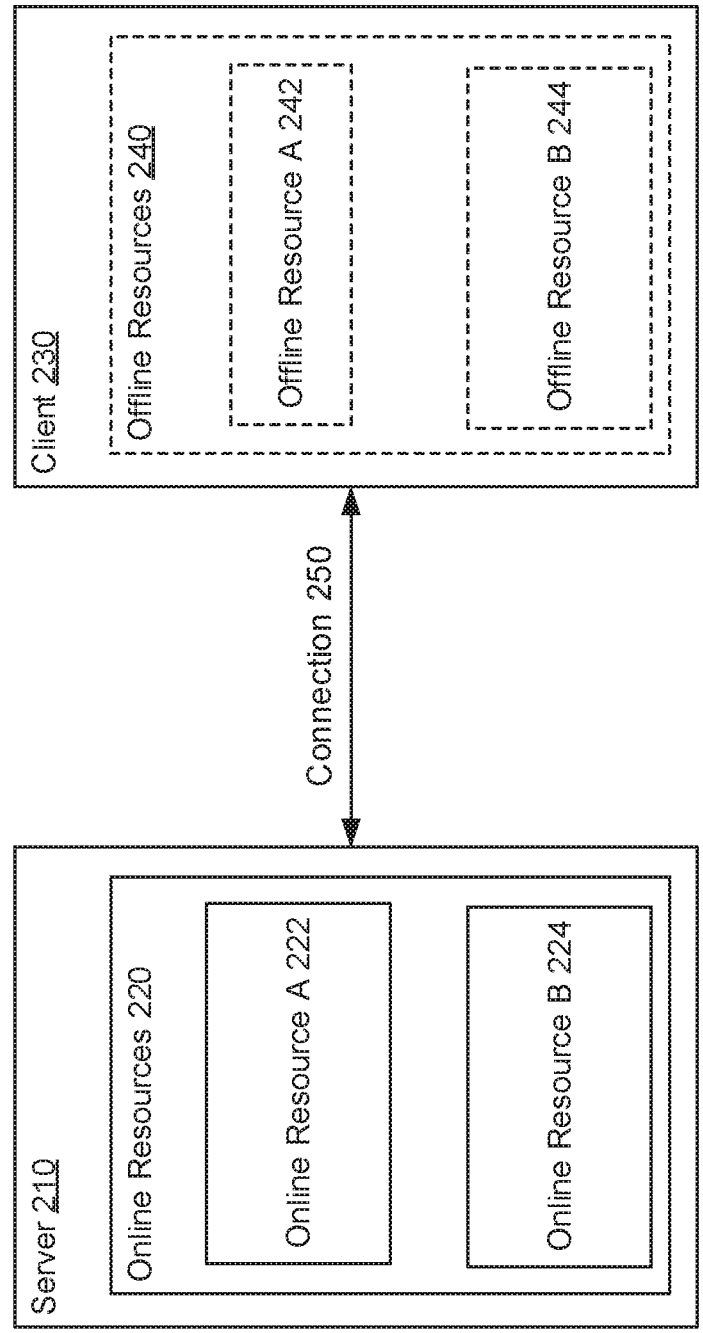
FIG. 2 illustrates an example caching of offline resources, in accordance with various embodiments.

FIG. 2 illustrates an example caching of offline resources, in accordance with various embodiments. A server 210 may communicate with a client 230 through a connection 250. A server may include and/or have access to online resources 220, including an online resource A 222 and an online resource B 224. The client 230 may access and/or use the online resources 220 via the connection 250 with the server 210. Online usage of the online resources 220 may require the connection 250 to be present/operational between the server 210 and the client 230. The server 210 may prepare an offline version of the online resources 220 for the client 230. The offline version of the online resources 220 may be provided to the client 230 for caching. That is, a cache of the client 230 may include the offline resources 240. An offline resource A 242 may be an offline version of the online resource A 222. An offline resource B 244 may be an offline version of the online resource B 224. The offline resource A 242 may include a portion of the online resource A 222. The offline resource B 244 may include all information and/or functionality of the online resource B 224. The offline resource A 242 and the offline resource B 244 may include one or more security parameters. The security parameter may define one or more security rules to be enforced with respect to offline usage of the corresponding resource.

The cache of the offline resources 240 may enable offline usage of the online resources 220 by the client 230. For example, the cache of the offline resource A 242 may enable offline usage of the online resource A 222 regardless of the connection 250. The security rule(s) for the offline usage of the online resource A 222 may be enforced by the client 230 based on the security parameter(s) of the offline resource A 242. The cache of the offline resource B 244 may enable offline usage of the online resource B 224 regardless of the connection 250. The security rule(s) for the offline usage of the online resource B 224 may be enforced by the client 230 based on the security parameter(s) of the offline resource B 244.

Figure 3:
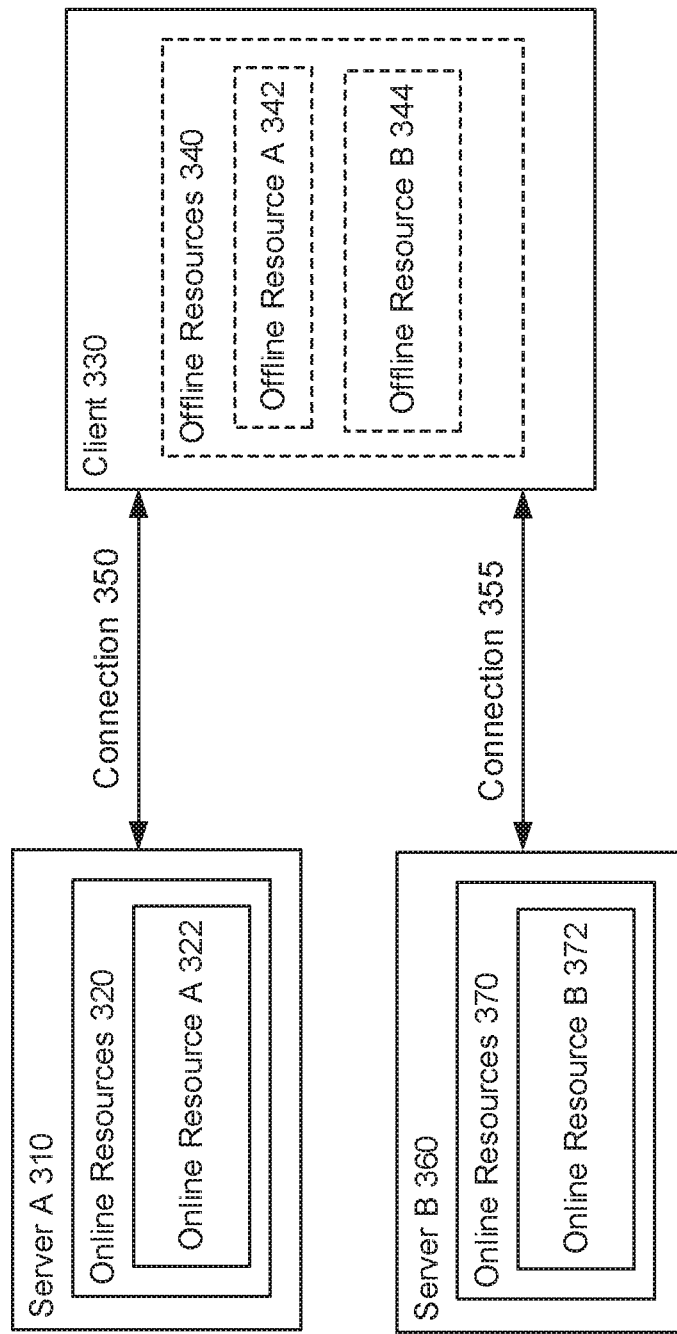
FIG. 3 illustrates an example caching of offline resources, in accordance with various embodiments.

FIG. 3 illustrates an example caching of offline resources, in accordance with various embodiments. A server A 310 may communicate with a client 330 through a connection 350, and a server B 360 may communicate with the client 330 through a connection 355. The server A 310 may include and/or have access to online resources 320, including an online resource A 322. The server B 360 may include and/or have access to online resources 370, including an online resource B 372. The client 330 may access and/or use the online resources 320 via the connection 350 with the server A 310. The client 330 may access and/or use the online resources 370 via the connection 355 with the server B 360. Online usage of the online resources 320, 370 may require the connections 350, 355, respectively, to be present/operational between the servers 310, 360 and the client 330.

The server A 310 may prepare and provide an offline version of the online resources 320 for the client 330. For example, the server A 310 may prepare and provide an offline version of the online resource A 322 to the client 330, which may cache it as an offline resource A 342. The server B 360 may prepare and provide an offline version of the online resources 370 for the client 330. For example, the server B 360 may prepare and provide an offline version of the online resource B 372 to the client 330, which may cache it as an offline resource A 344. The offline resource A 342 may include a portion of the online resource A 322. The offline resource B 344 may include all information and/or functionality of the online resource B 372. The offline resource A 242 and the offline resource B 244 may include one or more security parameters. The security parameter may define one or more security rules to be enforced with respect to offline usage of the corresponding resource.

In some embodiments, one or more of the offline versions of the resources may be prepared and/or provided based on relationship and/or dependency without another resource. For example, offline usage of the online resource A 322 may require the online resource B 372. Preparing and providing the offline resource A 342 to the client 330 may include preparing and providing the offline resource B 344 to the client 330. In some embodiments, the offline resource B 344 may be included in the offline resource A 342. Such preparation and provision of related/dependent resource(s) into an offline version of a resource may enable the client 330 to provide offline usage of the online resource A 322 regardless of the status of connections 350, 355 with the servers 310, 360.

Figure 4A:
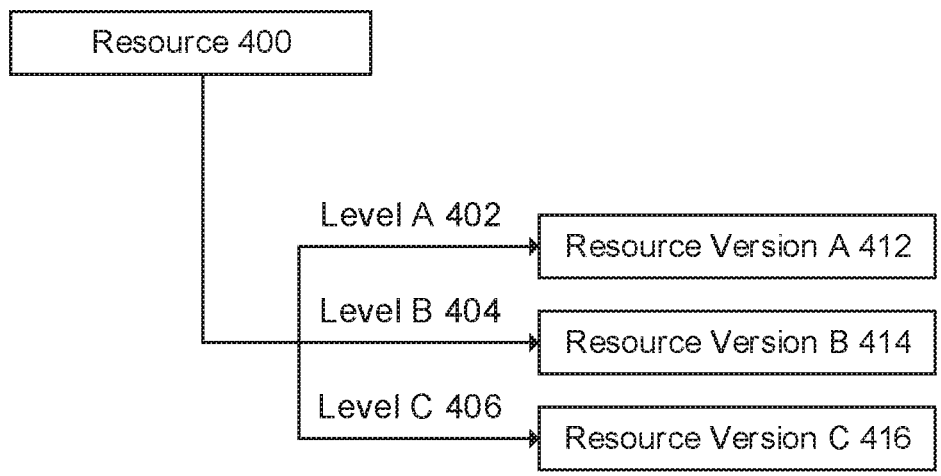
FIG. 4A illustrates an example preparation of resource versions based on security parameters, in accordance with various embodiments.

FIG. 4A illustrates an example preparation of resource versions based on security parameters, in accordance with various embodiments. Security parameters (defining different security rules, defining different access to the resource 400) may include a level A 402, a level B 404, and a level C. For example, the level A 402 may refer to a confidential-level access of the resource 400, the level B 404 may refer to a secret-level access of the resource 400, and the level C 406 may refer to a top secret-level access of the resource 400. To cache the resource 400 for offline usage, different versions of the resource 400 may be prepared and/or stored. For example, a resource version A 412 may include information within the resource 400 filtered based on the level A 402. A resource version B 414 may include information within the resource 400 filtered based on the level B 404. A resource version C 416 may include information within the resource 400 filtered based on the level C 406. Such caching of resources may take too much space and/or not be scalable.

Figure 4B:
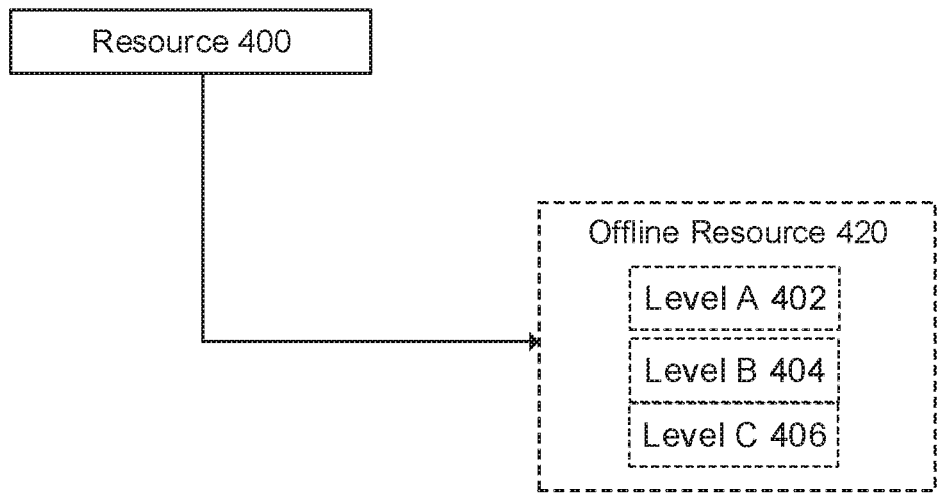
FIG. 4B illustrates an example preparation of resource with security parameters, in accordance with various embodiments.

FIG. 4B illustrates an example preparation of resource with security parameters, in accordance with various embodiments. Security parameters (level A 402, level B 404, level C 406) may be included within an offline resource 420, which may be used to provide an offline usage of the resource 400 by a computing device. The offline resource 420 may be cached by the computing device. Including the security parameters within the offline resource 420 may imbue the cache in the ability to identify which portions of the offline resource 420 should be provided to different users, such as which portions of the offline resource 420 should be provided to a user with a confidential-level access of the resource 400, a user with a secret-level access of the resource 400, and a user with a top secret-level access of the resource 400. Thus, rather than having to store three different offline versions of the resource 400 (shown in FIG. 4A), a single offline version of the resource 400 (the offline resource 420) may be stored.

Figure 5:
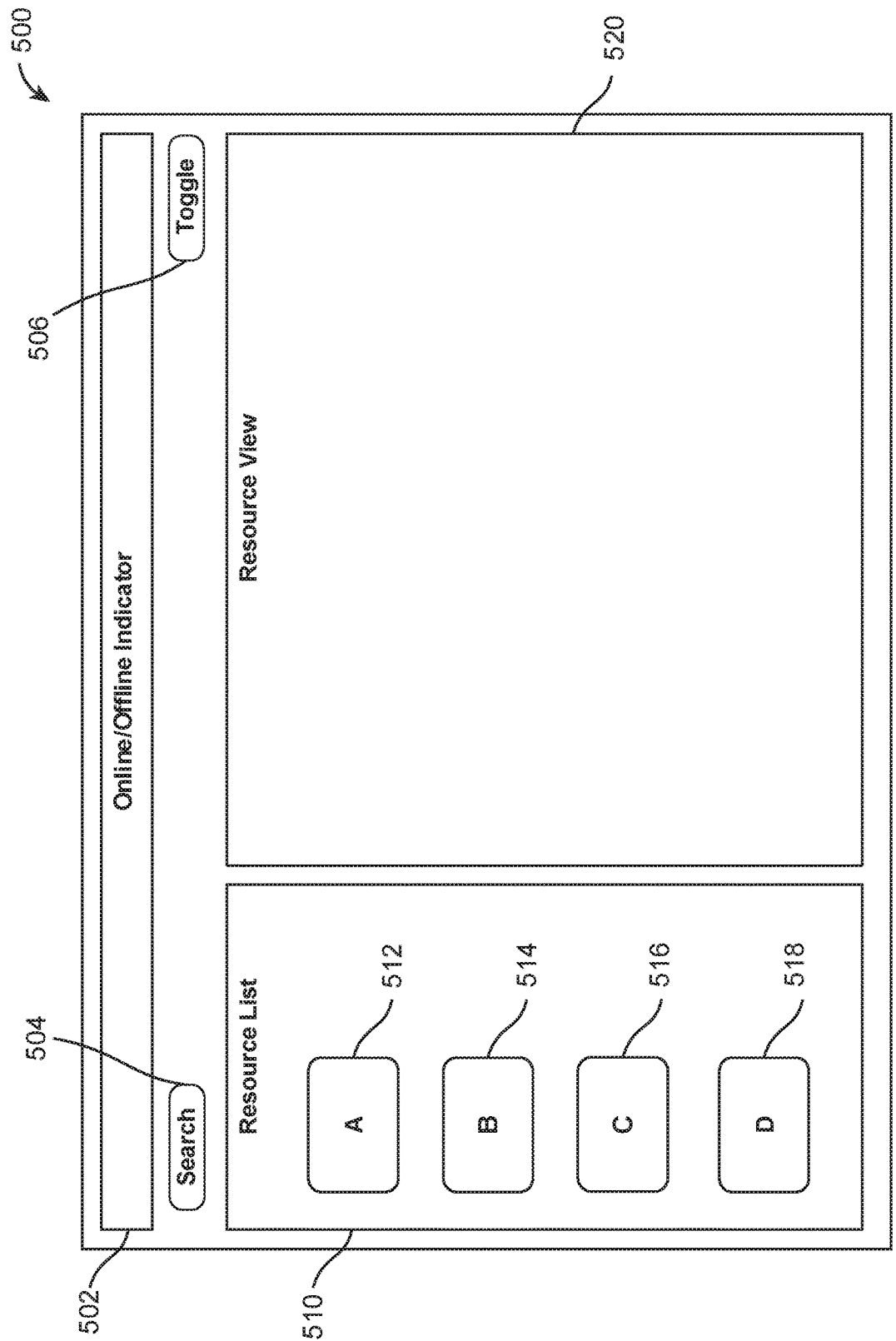
FIG. 5 illustrates an example user interface, in accordance with various embodiments.

FIG. 5 illustrates an example user interface 500, in accordance with various embodiments. In various embodiments, the user interface 500 may be accessed through a software application running on a computing device (e.g., computers, mobile phones, tablets, etc.) that includes one or more processors and memory. For example, the user interface 500 may be accessible through a web browser. In another example, the user interface 500 may be provided through a data analysis application. In yet another example, the user interface 500 may be provided as a service over a network (e.g., software as a service). Depending on the computing device, the user may be able to interact with the user interface 500 using various input devices (e.g., keyboard, mouse, etc.) and/or touch/gestures. The user interface 500 is provided merely as an example and, naturally, the arrangement and configuration of such user interfaces can vary depending on the implementation. Thus, depending on the implementation, the user interface 500 may include additional features and/or alternative features. The user interface 500 may include/enable one or more functionalities of the computing system 110/components of the computing system 110.

The user interface 500 may include an online/offline indicator section 502, a search option 504, a toggle option 506, a schedule option 508, a resource list section 510, and a resource view section 520. The online/offline indicator section 502 may provide information on whether a computing device is operating in an online mode or an offline mode. Operating in the online mode may include the computing device communicating with one or more servers to access one or more resources. Operating in the offline mode may include the computing device using offline version(s) of one or more resources to provide offline usage of the resource(s). The online/offline indicator section 502 may provide information on the operating mode using one or more of text, graphics, colors and/or other visual elements. Other parts of the user interface may change based on the operating mode.

The search option 504 may enable a user to search for one or more resources. For example, the search option 504 may cause a search interface to be displayed, and the user may enter one or more criteria (keyword searching/filtering, temporal searching/filtering, geospatial searching/filtering, object-type searching/filtering) by which resource(s) may be found. The user may request offline version of the found resource(s). The offline version of the resource(s) may be provided when the request is made (after preparation of the offline version) and/or at some later time (scheduled time for preparation and/or provision of the offline version).

The toggle option 506 may enable a user to switch between the online mode or the offline mode. In some embodiments, one or more offline versions of the resource(s) may be prepared and/or provided based on the user activating the toggle option 506. The resource(s) for which offline versions are prepared and/or prepared may include those resources that are active/being used when the user activated the toggle option. The offline version of the resource(s) may be synchronized with the online version of the resource when the user activates the toggle option 506 to return the operation to the online mode.

The resource list section 510 may list one or more resources. For example, the resource list section 510 may list icons 512, 514, 516, 518 representing different resources. In some embodiments, the resources listed in the resource list section 510 may include available resources, such as online resources available from one or more server and/or one or more offline versions of resources within a local cache. In some embodiments, online resources may be presented differently (e.g., different shape, different color, different icon) from offline versions of the resources.

The resource view 520 may provide a view of one or more resources. For example, for an application resource, the resource view 520 may provide a view of the application. In some embodiments, an offline version of an application may have limited functionality compared to the online version of the application. The deactivated functionalities may not be shown within the resource view 520 or may be shown differently from available functionalities. As another example, for a dataset resource, the resource view 520 may provide a view of the dataset. In some embodiments, an offline version of a dataset may include only a subset of the dataset. The portion of the dataset not included in the offline version of the dataset may not be shown within the resource view 520 or may be shown differently from the portion of the dataset included in the offline version of the dataset.

Figure 6:
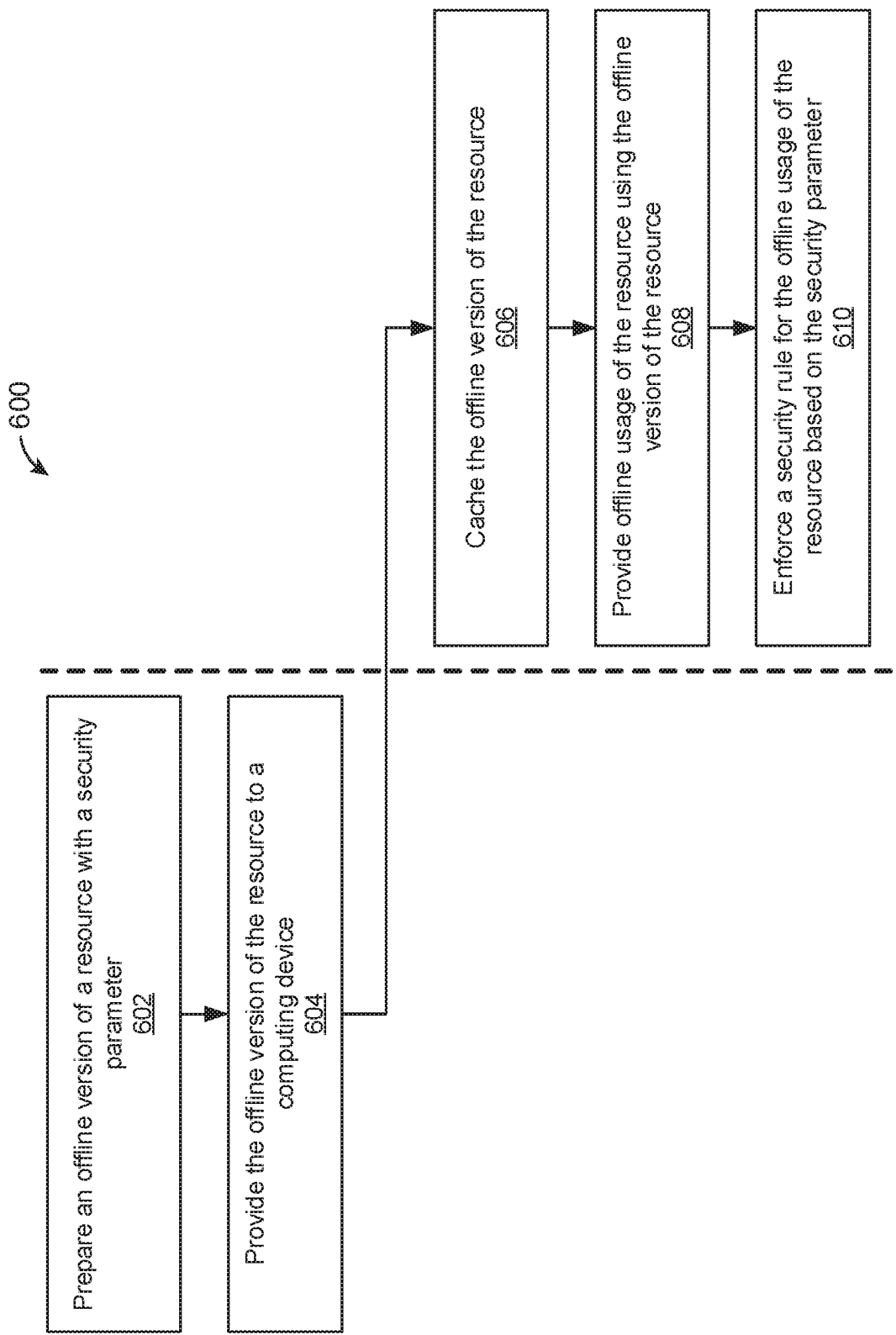
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, an offline version of a resource may be prepared with a security parameter. The offline version of the resource may include the security parameter. The security parameter may define a security rule to be enforced with respect to offline usage of the resource. The offline version of the resource may be prepared for a computing device. At block 604, the offline version of the resource may be provided to the computing device for caching by the computing device. At block 606, the offline version of the resource may be cached by the computing device. At block 608, offline usage of the resource may be provided by the computing device using the offline version of the resource (cached by the computing device). At block 610, the security rule for the offline usage of the resource may be enforced by the computing device based on the security parameter.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
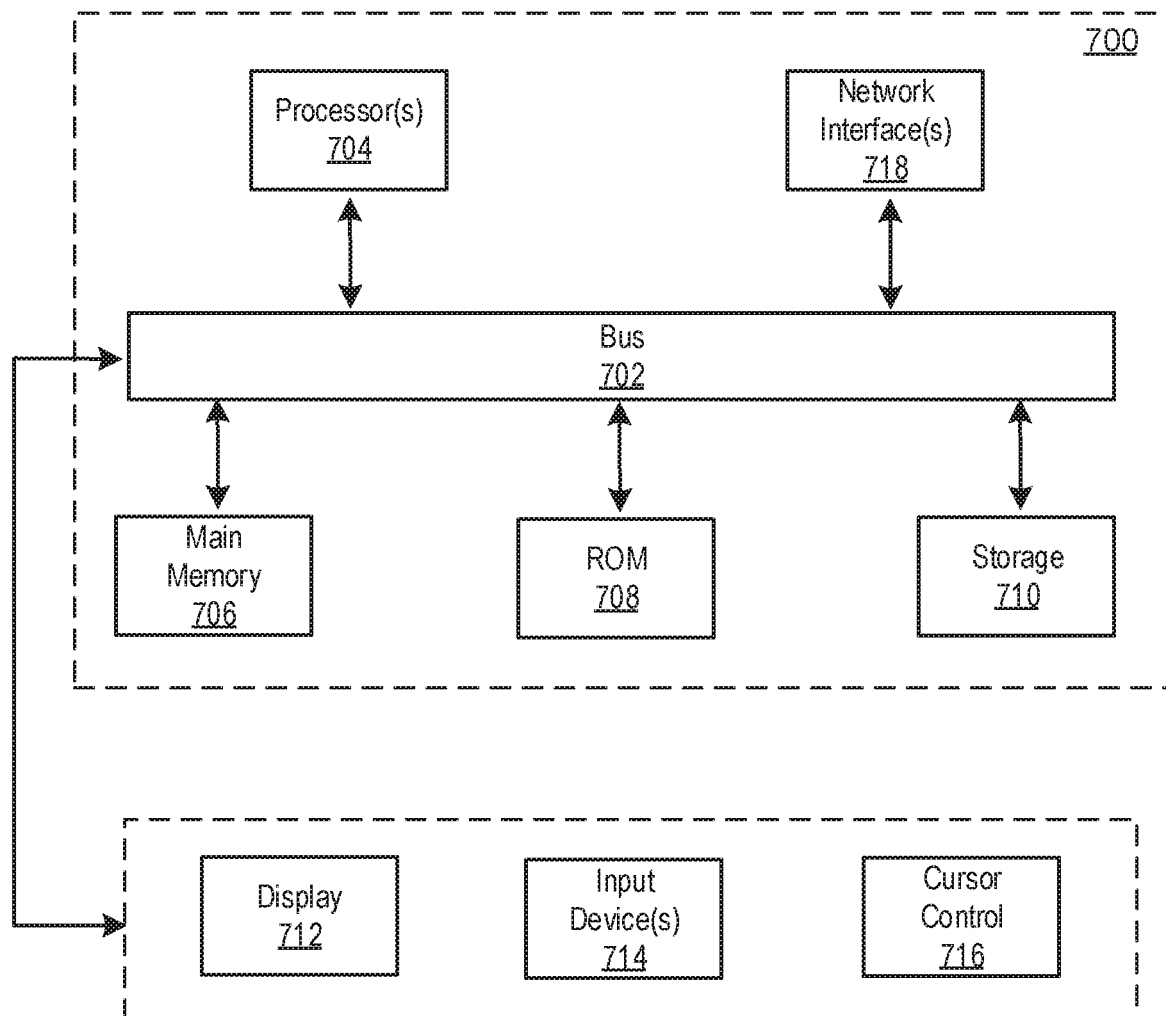
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method, comprising:
   determining that a network performance parameter indicative of a strength or quality of the network connection between a client device and a server will drop below a threshold value during a future time period;
   in response to determining or predicting that the network performance will drop below the threshold value during the future time period, preparing, by the server, an offline version of a resource, wherein preparing the offline version of the resource comprises associating a security rule with the offline version of the resource, the security rule defining use criteria for offline usage of the offline version of the resource; and
   providing, by the server system, the offline version of the resource to the client device to enable the client device to use the resource in the absence of a network connection between the client device and the server system.

2. The computer-implemented method of claim 1, wherein the resource is a first dataset, and wherein preparing the offline version of the first dataset comprises incorporating at least a portion of a second dataset into the offline version of the first dataset.

3. The computer-implemented method of claim 1, wherein the resource is an application, and wherein preparing the offline version of the application comprises incorporating at least a portion of a dataset into the offline version of the application to enable offline usage of the application.

4. The computer-implemented method of claim 1, further comprising:
   receiving a request from the client device for the offline version of the resource,
   wherein preparing the offline version of the resource comprises preparing the offline version of the resource responsive to receiving the request.

5. The computer-implemented method of claim 1, wherein the security rule requires a higher level of authentication for the offline usage of the offline version of the resource than for online usage of the resource.

6. The computer-implemented method of claim 1, wherein preparing the offline version of the resource comprises including, in the offline version of the resource, one or more objects created during online usage of the resource.

7. The computer-implemented method of claim 1, further comprising:
   sending, by the server system to the client device, an update to the offline version of the resource, wherein the client device is configured to locally incorporate the update into the offline version of the resource stored in a cache of the client device.

8. The computer-implemented method of claim 1, further comprising:
   tracking, using a global clock, whether an entirety of the offline version of the resource has been updated; and
   tracking, using an object clock, whether a particular object of the offline version of the resource has been updated.

9. The computer-implemented method of claim 1, wherein the client device reverts back to usage of an online version of the resource when the network connection is established.

10. A system, comprising:
    at least one processor; and
    at least one memory storing computer-executable instructions, wherein the at least one processor is configured to access the at least one memory and execute the computer-executable instructions to:
       determine or predict that a network performance parameter indicative of a strength or quality of the network connection between a client device and the system will drop below a threshold value during a future time period;
       in response to determining or predicting that the network performance parameter will drop below the threshold value during the future time period, prepare, for the client device, an offline version of a resource, wherein preparing the offline version of the resource comprises associating a security rule with the offline version of the resource, the security rule defining use criteria for offline usage of the offline version of the resource; and
       provide, by the system, the offline version of the resource to the client device to enable the client device to use the resource in the absence of a network connection between the client device and the server system.

11. The system of claim 10, wherein the resource is a first dataset, and wherein the at least one processor is configured to prepare the offline version of the first dataset by executing the computer-executable instructions to incorporate at least a portion of a second dataset into the offline version of the first dataset.

12. The system of claim 10, wherein the resource is an application, and wherein the at least one processor is configured to prepare the offline version by executing the computer-executable instructions to incorporate at least a portion of a dataset into the offline version of the application to enable offline usage of the application.

13. The system of claim 10, wherein the at least one processor is further configured to execute the computer-executable instructions to receive a request from the client device for the offline version of the resource, and wherein the at least one processor is configured to prepare the offline version responsive to receiving the request.

14. The system of claim 10, wherein the security rule requires a higher level of authentication for the offline usage of the offline version of the resource than for online usage of the resource.

15. The system of claim 10, wherein the at least one processor is configured to prepare the offline version of the resource by executing the computer-executable instructions to include, in the offline version of the resource, one or more objects created during online usage of the resource.

16. The system of claim 10, wherein the at least one processor is further configured to execute the computer-executable instructions to:
    send, to the client device, an update to the offline version of the resource, wherein the client device is configured to locally incorporate the update into the offline version of the resource stored in a cache of the client device.

17. The system of claim 10, wherein the at least one processor is further configured to execute the computer-executable instructions to:

track, using a global clock, whether an entirety of the offline version of the resource has been updated; and track, using an object clock, whether a particular object of the offline version of the resource has been updated.

18. The system of claim 10, wherein the client device reverts back to usage of an online version of the resource when the network connection is established.

19. A system, comprising:

at least one processor; and at least one memory storing computer-executable instructions, wherein the at least one processor is configured to access the at least one memory and execute the computer-executable instructions to:

prepare, for a client device, an offline version of a resource, wherein preparing the offline version of the resource comprises associating a security rule with the offline version of the resource, the security rule defining use criteria for offline usage of the offline version of the resource;

provide, by the system, the offline version of the resource to the client device to enable the client device to use the resource in the absence of a network connection between the client device and the server system;

track, using a global clock, whether an entirety of the offline version of the resource has been updated; and track, using an object clock, whether a particular object of the offline version of the resource has been updated.

\* \* \* \* \*